US006504331B1

(12) United States Patent
Longrod

(10) Patent No.: US 6,504,331 B1
(45) Date of Patent: Jan. 7, 2003

(54) DRIVE MECHANISM FOR TRANSACTION PRINTER

(75) Inventor: Scott J. Longrod, Lansing, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

(21) Appl. No.: 09/818,336

(22) Filed: Mar. 28, 2001

(51) Int. Cl.[7] .................................................. H02P 5/00

(52) U.S. Cl. ...................... 318/280; 318/284; 101/38.1; 101/39; 101/40; 101/40.1

(58) Field of Search ................................ 318/280, 284; 101/38.1, 39, 40, 40.1; 83/283

(56) References Cited

U.S. PATENT DOCUMENTS

| | | | | |
|---|---|---|---|---|
| 4,074,797 A | * | 2/1978 | Lewis et al. | 101/93.04 |
| 5,749,277 A | * | 5/1998 | Walker | 83/563 |
| 5,768,675 A | * | 6/1998 | Estabrooks | 101/224 |

* cited by examiner

*Primary Examiner*—Rita Leykin
(74) *Attorney, Agent, or Firm*—George R. McGuire; Hancock & Estabrook, LLP

(57) ABSTRACT

A compact drive mechanism for both driving a paper web and severing a printed receipt in a transaction or point-of-sales printer. Both driving the paper web and cutting the printed receipt is accomplished through a bi-directional stepper motor that is operative through a one-way clutch.

3 Claims, 1 Drawing Sheet

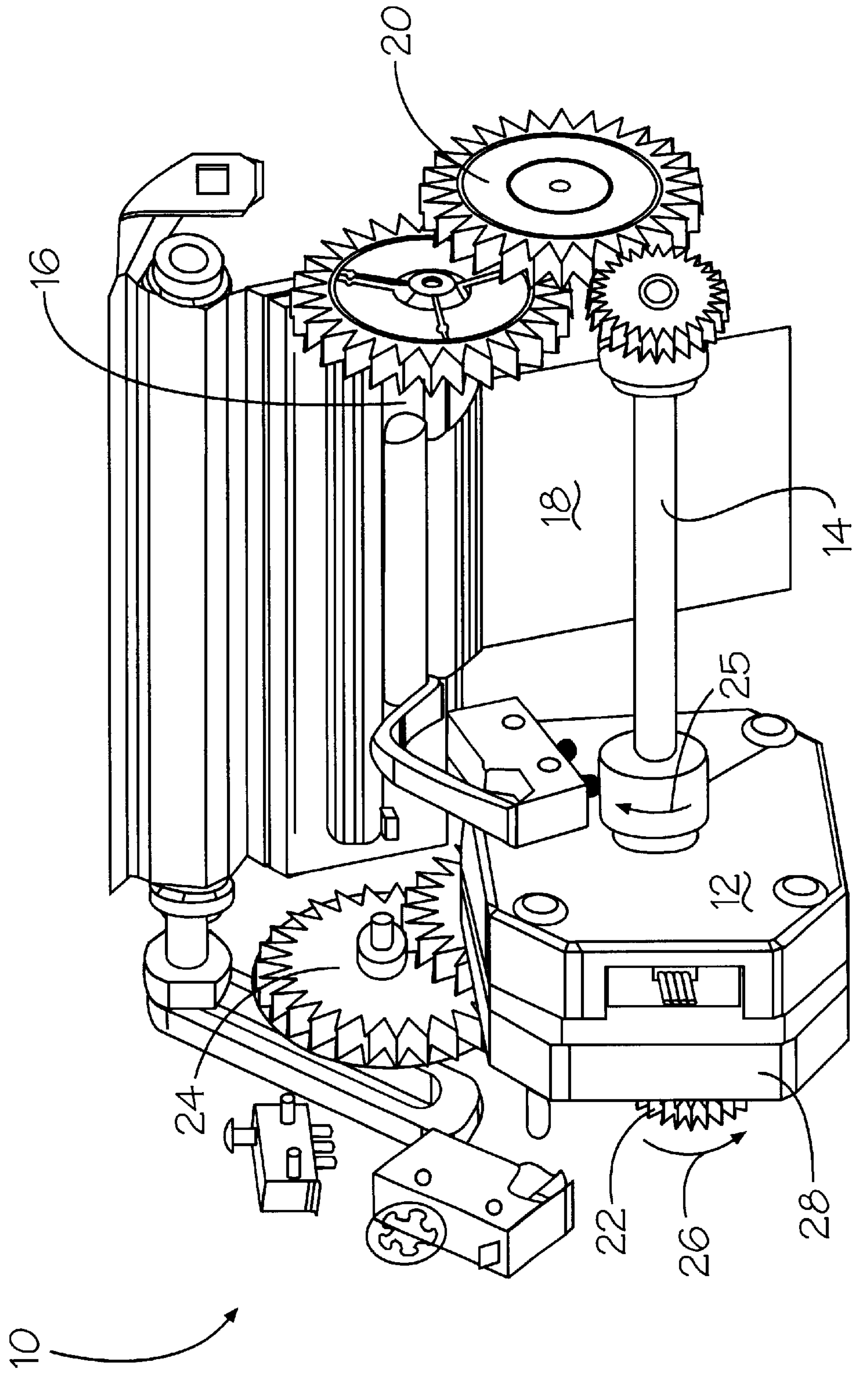
*The Figure*

DRIVE MECHANISM FOR TRANSACTION PRINTER

FIELD OF THE INVENTION

The present invention relates to transaction printers and, more particularly, to an improved sales receipt printing mechanism for a transaction printer.

BACKGROUND OF THE INVENTION

In the art of transaction printers, it is customary for the drive mechanism to comprise two motors. One of the two motors is used for driving the supply roll during the printing operation. The second of the two motors is used to operate a cutting blade for severing the advanced paper web, once the receipt is printed.

The present invention seeks to provide a single drive motor to accomplish both the paper feed, and the paper cutting operation. The reduction of parts minimizes the cost of the printing mechanism, while providing a more compact printing unit.

The current invention provides a single, bi-directional stepper motor connected to the paper feed rollers in a receipt printer. The stepper motor is programmed to turn the paper feed rollers, when operative in a clockwise direction. The motor is also connected to the pinion gear of a rotating knife blade that causes the severance of the paper, when operative in a counter-clockwise direction.

The motor is connected to the knife blade pinion gear through a spring-wrapped, one-way clutch. The one-way clutch is intermediate of the pinion gear, so that when the motor is operative in a clockwise direction, as when it is driving the paper feed rollers, it does not cut the receipt.

The stepper motor is programmed to make two initial steps to drive the paper feed rollers before printing is initiated. This is necessary to eliminate squeezing together or compressing the print dots on the first row of the receipt printout during the print start-up. The extra two motor steps is accomplished through the print software.

SUMMARY OF THE INVENTION

In accordance with the present invention, there is provided an improved transaction printer drive mechanism. The drive mechanism comprises a single, bi-directional stepper motor connected to the paper feed rollers driving the receipt paper web. The stepper motor is programmed to turn the paper feed rollers, when operative in a clockwise direction. The motor, when operative in a counter-clockwise direction, causes the severance of the receipt paper web. This is accomplished by its connection to the pinion gear of a rotating knife blade. The motor is connected to the knife blade pinion gear through a spring-wrapped, one-way clutch. The one-way clutch is intermediate of the pinion gear, so that when the motor is operative in a clockwise direction, as when it is driving the paper feed rollers, it does not cut the receipt. The stepper motor is programmed to make two initial steps to drive the paper feed rollers before printing is initiated. This is necessary to eliminate squeezing together the print dots on the first row of the receipt printout during print start-up.

It is an object of this invention to provide an improved drive mechanism for a transaction printer.

It is another object of the invention to provide a sales receipt printing and severing mechanism that is operative through a single, bi-directional motor.

It is still another object of this invention to provide an improved drive mechanism for a transaction printer that is less expensive and more compact.

BRIEF DESCRIPTION OF THE DRAWINGS

A complete understanding of the present invention may be obtained by reference to the accompanying drawing, when considered in conjunction with the subsequent detailed description, in which:

THE FIGURE illustrates a perspective view of the paper driving and severing mechanism of this invention.

DESCRIPTION OF THE PREFERRED EMBODIMENT

Generally speaking, the invention features a compact drive mechanism for both driving a paper web and for serving the printed receipt in a transaction printer. Both the driving of the paper web and the cutting of the printed receipt is accomplished through a bi-directional stepper motor that is operative through a one-way clutch.

Now referring to the FIGURE, a drive mechanism 10 of this invention is illustrated in perspective view. The drive mechanism 10 consists of a bi-directional stepper motor 12 that is connected on one end to a shaft 14. The shaft 14 is rotated in a clockwise direction (arrow 25) by the bi-directional stepper motor 12 in order to drive a pair of feed rollers 16 that drive paper receipt web 18 via a set of spur gears 20.

The stepper motor 12 is connected at its other end to the pinion gear 22 that drives a set of spur gears 24 that, in turn, operates a cutting blade (not shown), which severs the receipt 18 after printing has terminated. The pinion gear 22 is driven in a counter-clockwise direction by the stepper motor 12, as shown by arrow 26.

A spring-wound, one-way clutch 28 is disposed intermediate of the stepper motor 12 and the pinion gear 22. When the stepper motor 12 is operative in a clockwise direction (arrow 25), as when it is driving the paper feed rollers 16, it does not cut the receipt 18.

The stepper motor 12 is controlled, preferably by means of a computer program loaded in a microprocessor or by firmware, to make two initial steps to drive the paper feed rollers 18 before printing is initiated. This is necessary to eliminate squeezing together or compressing the print dots on the first row of the receipt printout during print start-up.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A drive mechanism for a transaction printer, comprising:

a paper web for printing a receipt thereupon;

a cutting mechanism for severing said paper web;

bi-directional stepper motor for driving in a first direction said paper web that is printed with receipt information, and for driving in a second direction said cutting mechanism for severing said paper web after said receipt information has been printed upon said paper web;

means defining a program for controlling the bi-directional stepper motor, said program controlling said bi-directional stepper motor to move two initial steps to drive the paper web before printing is initiated, in order to eliminate a squeezing together of print dots on a first row of a receipt printout during print start-up; and a one-way clutch disposed intermediate of said cutting mechanism and said bi-directional motor, so that when said bidirectional motor is operative in said first direction, said cutting mechanism is inoperative for severing said paper web.

2. A drive mechanism for a transaction printer, comprising:

a bi-directional stepper motor for driving in a first direction a paper web that is printed with receipt information, and for driving in a second direction a cutting mechanism for severing said paper web after said receipt information has been printed upon said paper web;

a controller for controlling said bi-directional stepper motor for operating said bi-directional stepper motor in either said first or said second direction; and a one-way clutch disposed intermediate said cutting mechanism and said bi-directional motor, so that when said bi-directional motor is operative in said first direction, said cutting mechanism is inoperative for severing said paper web.

3. The drive mechanism for a transaction printer in accordance with claim 2, wherein said controller for controlling the bi-directional stepper motor movement provides control to move said bi-directional stepper motor in two initial steps in order to drive the paper web before printing is initiated to eliminate print dot compression on a first row of a receipt printout during print start-up.

* * * * *

UNITED STATES PATENT AND TRADEMARK OFFICE

CERTIFICATE OF CORRECTION

PATENT NO. : 6,504,331 B1 Page 1 of 1
DATED : January 7, 2003
INVENTOR(S) : Scott J. Longrod It is certified that error appears in the above-identified patent and that said Letters Patent is hereby corrected as shown below:

<u>Column 2,</u>
Line 62, insert -- a -- before “bi-directional”;

<u>Column 3,</u>
Line 9, insert a dash -- - -- between “bi” and “directional”.

Signed and Sealed this

Twenty-ninth Day of April, 2003

JAMES E. ROGAN
*Director of the United States Patent and Trademark Office*